(12) United States Patent
McKenna et al.

(10) Patent No.: US 9,266,054 B2
(45) Date of Patent: Feb. 23, 2016

(54) DURABLE ADSORBENT MATERIAL AND ADSORBENT PACKS AND METHOD OF MAKING SAME

(71) Applicant: Micropore, Inc., Elkton, MD (US)

(72) Inventors: Douglas B. McKenna, Avondale, PA (US); Nicholas J. Dunlop, Wilmington, DE (US)

(73) Assignee: Micropore, Inc., Elkton, MD (US)

( * ) Notice: Subject to any disclaimer, the term of this patent is extended or adjusted under 35 U.S.C. 154(b) by 59 days.

(21) Appl. No.: 13/868,838

(22) Filed: Apr. 23, 2013

(65) Prior Publication Data

US 2013/0276634 A1    Oct. 24, 2013

Related U.S. Application Data

(60) Provisional application No. 61/637,517, filed on Apr. 24, 2012.

(51) Int. Cl.
*B01D 53/047* (2006.01)
*B01D 53/02* (2006.01)
*B01D 53/04* (2006.01)

(52) U.S. Cl.
CPC .............. *B01D 53/047* (2013.01); *B01D 53/02* (2013.01); *B01D 53/0423* (2013.01); *B01D 53/0462* (2013.01); *B01D 53/0476* (2013.01); *B01D 2253/34* (2013.01)

(58) Field of Classification Search
CPC ...... B01D 53/02; B01D 53/04; B01D 53/047; B01D 53/0462; B01D 53/0476; B01D 2253/34

USPC ................................. 96/121, 153, 154; 55/520
See application file for complete search history.

(56) References Cited

U.S. PATENT DOCUMENTS

| 2,038,071 | A | * | 4/1936 | Wilhelm ........................ 96/118 |
| 2,395,842 | A | | 3/1946 | Borgstrom |
| 2,629,652 | A | | 2/1953 | Schechter et al. |
| 2,812,769 | A | | 11/1957 | Schaefer et al. |
| 2,837,413 | A | | 6/1958 | Hay |
| 3,034,655 | A | | 5/1962 | York |

(Continued)

FOREIGN PATENT DOCUMENTS

| EP | 171551 | 2/1986 |
| EP | 1064979 | 1/2001 |

(Continued)

OTHER PUBLICATIONS

Battelle (Battelle News Release: Naval Sea Systems Command Issues Submarines Life-Saving Lithium Hydroxide Curtains Developed by Battelle) Apr. 6, 2004 http://www.battelle.org/news/04/4-06-04LithCurtain.stm, 2 pgs.

(Continued)

*Primary Examiner* — Frank Lawrence
(74) *Attorney, Agent, or Firm* — Fish & Richardson P.C.

(57) ABSTRACT

Provided herein are a parallel passage contractors, which may be useful in pressure swing adsorption (PSA), pressure and temperature swing adsorption (PTSA), or vacuum pressure swing adsorption (VPSA) systems, having one or more self-supported adsorbent sheets arranged in multiple, overlapping layers mechanically spaced to allow gas flow. Also provided are systems utilizing such parallel passage contactors and methods for preparing the contactors.

24 Claims, 10 Drawing Sheets

(56) References Cited

U.S. PATENT DOCUMENTS

| | | | |
|---|---|---|---|
| 3,489,144 A | | 1/1970 | Dibelius et al. |
| 3,604,416 A | | 9/1971 | Petrahai et al. |
| 3,607,040 A | | 9/1971 | Hervert et al. |
| 3,755,535 A | | 8/1973 | Naber |
| 3,847,837 A | | 11/1974 | Boryta |
| 3,860,818 A | | 1/1975 | Stalder et al. |
| 3,909,206 A | | 9/1975 | Katz |
| 3,950,157 A | | 4/1976 | Matney |
| 4,153,661 A | | 5/1979 | Ree et al. |
| 4,168,706 A | | 9/1979 | Lovell |
| 4,234,326 A | | 11/1980 | Bailey et al. |
| 4,250,172 A | | 2/1981 | Mutzenberg et al. |
| 4,255,175 A | | 3/1981 | Wilkins |
| 4,342,278 A | | 8/1982 | Horan |
| 4,342,811 A | | 8/1982 | Lopatin et al. |
| 4,407,723 A | | 10/1983 | MacGregor et al. |
| 4,409,978 A | | 10/1983 | Bartos |
| 4,442,162 A | | 4/1984 | Kuester |
| 4,493,718 A | | 1/1985 | Schweizer |
| 4,508,700 A | | 4/1985 | Hoshiko |
| 4,553,983 A | | 11/1985 | Baker |
| 4,559,066 A | | 12/1985 | Hunter et al. |
| 4,565,727 A | | 1/1986 | Giglia et al. |
| 4,631,872 A | | 12/1986 | Daroga |
| 4,642,996 A | | 2/1987 | Harris et al. |
| 4,665,050 A | | 5/1987 | Degen et al. |
| 4,699,681 A | * | 10/1987 | Kasmark et al. ............... 156/264 |
| 4,707,953 A | | 11/1987 | Anderson et al. |
| 4,781,184 A | | 11/1988 | Fife |
| 4,985,296 A | | 1/1991 | Mortimer, Jr. et al. |
| 5,082,471 A | | 1/1992 | Athayde et al. |
| 5,165,399 A | | 11/1992 | Hochberg |
| 5,332,426 A | | 7/1994 | Tang et al. |
| 5,338,516 A | | 8/1994 | Zhang et al. |
| 5,449,014 A | | 9/1995 | Yan-ho |
| 5,665,148 A | | 9/1997 | Mühlfeld et al. |
| 5,742,516 A | | 4/1998 | Olcerst |
| 5,879,423 A | | 3/1999 | Luka et al. |
| 5,964,221 A | * | 10/1999 | McKenna ................ 128/205.12 |
| 6,024,782 A | * | 2/2000 | Freund et al. .................... 96/154 |
| 6,176,897 B1 | * | 1/2001 | Keefer ............... 95/98 |
| 6,192,633 B1 | | 2/2001 | Hilbert |
| 6,247,471 B1 | | 6/2001 | Bower et al. |
| 6,349,508 B1 | | 2/2002 | Ju et al. |
| 6,385,919 B1 | | 5/2002 | McCarthy |
| 6,428,680 B1 | | 8/2002 | Kreichauf |
| 6,429,165 B1 | * | 8/2002 | Nastke et al. ................ 502/159 |
| 6,565,627 B1 | | 5/2003 | Golden et al. |
| 6,699,309 B1 | | 3/2004 | Worthington, II et al. |
| 6,797,043 B2 | | 9/2004 | Nalette et al. |
| 6,840,986 B1 | * | 1/2005 | Koslow ........... 96/135 |
| 6,862,529 B2 | | 3/2005 | Brown et al. |
| 6,893,483 B2 | | 5/2005 | Golden et al. |
| 7,077,891 B2 | * | 7/2006 | Jaffe et al. ....................... 96/108 |
| 7,109,853 B1 | | 9/2006 | Mattson et al. |
| 7,196,023 B2 | | 3/2007 | Langley et al. |
| 7,282,464 B2 | | 10/2007 | Kimmel |
| 7,326,280 B2 | | 2/2008 | Hrycak et al. |
| 7,329,307 B2 | | 2/2008 | Hrycak et al. |
| 7,395,936 B2 | | 7/2008 | Knight |
| 7,402,199 B2 | | 7/2008 | Maru |
| 7,407,533 B2 | | 8/2008 | Steins |
| 7,470,311 B2 | | 12/2008 | Sueoka et al. |
| 7,481,234 B1 | | 1/2009 | Gustafson et al. |
| 7,959,720 B2 | | 6/2011 | Deckman et al. |
| 8,413,655 B2 | | 4/2013 | McKenna et al. |
| 8,685,153 B2 | | 4/2014 | McKenna et al. |
| 8,821,619 B2 | | 9/2014 | McKenna et al. |
| 2001/0012494 A1 | | 8/2001 | Kreichauf |
| 2001/0053667 A1 | | 12/2001 | Kreichauf |
| 2002/0124490 A1 | | 9/2002 | McCarthy |
| 2002/0134246 A1 | | 9/2002 | Babicki et al. |
| 2002/0170436 A1 | | 11/2002 | Keefer et al. |
| 2003/0011948 A1 | | 1/2003 | Saito et al. |
| 2003/0205131 A1 | | 11/2003 | Golden et al. |
| 2005/0145224 A1 | | 7/2005 | Zulauf et al. |
| 2005/0160912 A1 | | 7/2005 | Hrycak et al. |
| 2005/0160913 A1 | | 7/2005 | Hrycak et al. |
| 2005/0223894 A1 | | 10/2005 | Sohnemann |
| 2006/0042467 A1 | | 3/2006 | Maru |
| 2006/0048648 A1 | | 3/2006 | Gibbs et al. |
| 2006/0096458 A1 | | 5/2006 | Abdolhosseini et al. |
| 2006/0137522 A1 | | 6/2006 | Nishimura et al. |
| 2006/0150811 A1 | | 7/2006 | Callahan et al. |
| 2006/0162704 A1 | | 7/2006 | Hagler et al. |
| 2006/0169142 A1 | | 8/2006 | Rode et al. |
| 2007/0200420 A1 | | 8/2007 | McCormick |
| 2007/0253872 A1 | | 11/2007 | Keefer et al. |
| 2008/0148936 A1 | | 6/2008 | Baksh |
| 2008/0282887 A1 | | 11/2008 | Chance et al. |
| 2009/0293720 A1 | | 12/2009 | Liu |
| 2009/0301493 A1 | | 12/2009 | McKenna et al. |
| 2010/0065030 A1 | | 3/2010 | Bellis |
| 2011/0206572 A1 | | 8/2011 | McKenna et al. |
| 2012/0090470 A1 | | 4/2012 | McKenna et al. |
| 2014/0272207 A1 | | 9/2014 | McKenna et al. |
| 2014/0305309 A1 | | 10/2014 | McKenna et al. |
| 2014/0366738 A1 | | 12/2014 | McKenna et al. |

FOREIGN PATENT DOCUMENTS

| | | |
|---|---|---|
| WO | WO 01/07114 | 2/2001 |
| WO | WO 2005/086613 | 9/2005 |
| WO | WO 2006/025853 | 3/2006 |
| WO | WO 2007/117266 | 10/2007 |
| WO | WO 2009/152264 | 12/2009 |
| WO | WO 2010/129082 | 11/2010 |
| WO | WO 2011/094296 | 8/2011 |
| WO | WO 2012/051524 | 4/2012 |

OTHER PUBLICATIONS

Daley, Tom "A New Approach to Non-Regenerative CO2 Removal", Submarine Air Monitoring and Air Purification Conference (SAMAP), San Diego, CA (Oct. 21, 2009), 25 pgs.

Davis, et al, "The Dependence of the CO2 Removal Efficiency of LiOH on Humidity and Mesh Size", presented by The American Society of Mechanical Engineers, at the Intersociety Conference on Environmental Systems, San Diego, California, Jul. 10-13, 1978, 7 pgs.

Davis, et al, "The Factors Influencing the Formation of Li2o3 from LiOH and CO2", presented by The American Society of Mechanical Engineers, at the Intersociety Environmental Systems Conference, San Diego, California, Jul. 14-17, 1980, 6 pgs.

General Specification NASA-JSC, Requirements for Lithium Hydroxide Used for CO2 Removal in Closed Environments, National Aeronautics and Space Administration, Houston, Texas, Oct. 1994, 30 pgs.

"Lithium Hydroxide, Anhydrous", pamphlet CAS No. 1310-65-2, FMC Corporation, copyright 2001, 2 pgs.

Military Specification for Lithium Hydroxide (LiOH), Technical, MIL-L-20213E, Naval Sea Systems Command, Jun. 18, 1980, 12 pgs.

The American Heritage Dictionary of the English Language: Fourth Edition 2000, 2 pgs.

Wang, "Residence Time and Carbon Dioxide Scrubbing Efficiency in Life Support Systems", Aviation Space and Environmental Medicine, Feb. 1981, pp. 104-108.

Webster's Third New International Dictionary, unabridged, 1993, downloaded from the Internet on Nov. 19, 2009, http://lionreference.chadwyck.com/searchFulltext.do?id=31052187&idType=offset &divLevel=2 . . . , 1 pg.

Extended European Search Report in EP Application No. EP 11737564.2, dated Jul. 16, 2013, 6 pages.

Supplementary European Search Report in EP Application No. EP 11737564.2, dated Aug. 2, 2013, 7 pages.

Examiner's First Report dated Oct. 10, 2007 for Australian Appln. No. 2005280633, 2 pgs.

International Preliminary Report on Patentability and Written Opinion dated Jul. 31, 2006 for International Appln. No. PCT/US2005/003480, 8 pgs.

(56) References Cited

OTHER PUBLICATIONS

International Preliminary Report on Patentability and Written Opinion dated Jul. 8, 2008 for International Appln. No. PCT/US2006/031847, 6 pgs.
International Preliminary Report on Patentability and Written Opinion dated Dec. 13, 2010 for International Appln. No. PCT/US2009/046939, 9 pgs.
International Preliminary Report on Patentability in International Application No. PCT/US2011/022556, dated Jul. 31, 2012, 7 pages.
International Preliminary Report on Patentability in International Application No. PCT/US2011/056345, dated Apr. 16, 2013, 10 pages.
International Search Report dated Feb. 1, 2006 for International Appln. No. PCT/US2005/003480, 3 pgs.
International Search Report dated Apr. 30, 2008 for International Appln. No. PCT/US2006/031847, 3 pgs.
International Search Report dated Aug. 12, 2009 for International Appln. No. PCT/US2009/046939, 1 pg.
International Search Report and Written Opinion dated Mar. 29, 2011 for International Appln. No. PCT/US2011/022556, 7 pgs.
International Search Report and Written Opinion dated Feb. 16, 2012 for International Appln. No. PCT/US2011/056345, 12 pgs.
International Search Report and Written Opinion in International Application No. PCT/US2013/037776, dated Sep. 13, 2013, 10 pages.
A. Dabrowski, "Adsorption—its development and applications for practical purposes", Applications in Industry, Meurant (editor), vol. 1, p. 91, Elsevier, Dec. 1998.
Anshan Sinocarb Carbon Fibers Co., Ltd., Chopped Pitch-based Activated Carbon Fiber/Fibre(length 50mm): Product Detail (downloaded May 18, 2015), http://sinocarbln.ecol.xyz/products/other-recycling-products/p688205/chopped-pitch-based-activated-carbon-fiber-fibre-length-50mm.html.
Lausted, et al., BioMedical Engineering OnLine, "Maximum static inspiratory and expiratory pressures with different lung volumes", 2006, 5:29 (at http://www.ncbi.nlm.nih.gov/pmc/articles/PMC1501025/).
Lorimier, et al., "Indoor Air Particulate Filtration onto Activated Carbon Fiber Media", J. Environ. Eng., 134(2), 126-137.
Extended European Search Report in EP Application No. EP 11833483.8, dated Sep. 30, 2014, 6 pages.
Supplementary European Search Report in EP Application No. EP 11833483.8, dated Oct. 17, 2014, 7 pages.
International Preliminary Report on Patentability in International Application No. PCTUS2013/037776, mailed Nov. 6, 2014, 8 pages.

\* cited by examiner

1. Element sealing/housing method:

Internal and external chamfer machined on spacer ring to assist in sealing of element and column.

Element sealed and bonded using silicone sealant on top and bottom faces of spacer rings

DURABLE ADSORBENT MATERIAL AND ADSORBENT PACKS AND METHOD OF MAKING SAME

This application claims the benefit of priority of U.S. Provisional Appl. 61/637,517, filed Apr. 24, 2012, which is incorporated herein by reference in its entirety.

FIELD OF THE INVENTION

The present invention relates to adsorbent materials, adsorbent packs, methods of making an adsorbent material and/or adsorbent pack, and methods of enriching and/or reducing a gas.

BACKGROUND

Self-supporting adsorbent materials comprising adsorbent particles and a binder are used in a wide variety of applications. Some applications however, such as pressure swing adsorption, are very demanding and currently available adsorbent materials lack sufficient strength and durability without high binder content. Pressure swing adsorption adsorbents are typically packed beds of adsorbent granules with different shapes that have many shortcomings. These adsorbent materials physically degrade from the damaging effects of pressure swing cycles. In addition, because of the high pressure drop through beds of granules, the flow rate must be kept low to minimize lifting of the granules from the packed beds. This high pressure drop also limits the allowable height of the adsorbent bed, which limits the time between pressure swing cycles, thereby reducing efficiency of the system. Replacement of damaged adsorbent beds requires the system to be shut down further increasing in use costs. Finally, the beads distribution may not be uniform resulting in low and high flow areas across the surface of the packed bed, which results in systems that must be larger than desired to account for large performance variations.

There exists a need for an adsorbent material and adsorbent pack that has high strength and durability, as well as high adsorbent particle concentration and high gas adsorption rate. In particular, there exists a need for an adsorbent material and adsorbent pack that is suitable for pressure swing adsorption applications, having high durability and high gas adsorption properties.

SUMMARY OF THE INVENTION

In some embodiments, a system for pressure swing adsorption (PSA), pressure and temperature swing adsorption (PTSA), or vacuum pressure swing adsorption (VPSA) is provided, comprising a parallel passage contactor (PPC) structure comprising one or more self-supported adsorbent sheets arranged in multiple, overlapping layers mechanically spaced to allow gas flow between said layers from one end of the structure to the other, wherein said one or more adsorbent sheets comprises adsorbent particles and a polymer binder; wherein the adsorbent particles in said sheet can be of one or more types and each type of adsorbent particles have a mean particle size of greater than 200 nm. In some embodiments, the adsorbent sheet is made by a thermally induced phase separation process. In some embodiments, the polymer is a polyethylene binder. In some embodiments, the adsorbent particles are of a single type and have a mean particle size of greater than 200 nm. In some embodiments, self-supported means that the sheets do not require a backing. In some embodiments, the adsorbent sheets are reinforced by fibers formed during the making of the sheets (e.g., are self-reinforced). The sheets are generally flexible enough to allow winding of the sheet to form a spirally wound PPC structure. In some embodiments, wherein said adsorbent sheets have substantially parallel ribs disposed on said one or more sheets, which mechanically space said layers to allow gas flow. In some embodiments, the parallel contactor structure comprises a single adsorbent sheet, which is spirally wound, having substantially parallel ribs disposed on said sheet, wherein said ribs mechanically space said layers to allow gas flow. In some embodiments, the PPC structure consists essentially of said adsorbent particles and said polyethylene binder. In some embodiments, the PPC structure additionally comprises reinforcement fibers as described herein. In some embodiments, the adsorbent sheet is less than 0.10 inches, 0.09 inches, less than 0.08 inches, less than 0.07 inches, less than 0.06 inches or less than 0.05 inches in thickness, including the ribs. In some embodiments, the thickness of the sheet, excluding the ribs is from 0.01 to 0.06 inches. In some embodiments, the thickness of the ribs disposed on the sheet is from 0.01 to 0.04 inches.

In some embodiments, the PPC structure is mechanically stable after 200,000 or 1,000,000 cycles.

In some embodiments, the binder comprises 0.25% to 10%, 0.25% to 9%, 0.25% to 8%, 0.25% to 7%, 0.25% to 6%, 0.25% to 5%, 0.25% to 4%, 0.25% to 3%, 0.25% to 2%, or 0.25% to 1% by weight of said sheet. In some embodiments, the binder is high-density polyethylene or ultra high molecular weight polyethylene. In some embodiments, the binder comprises 0.5% to 1%, 0.5% to 2%, 0.5% to 3%, 0.5% to 4%, 0.5% to 5%, 0.5% to 6%, 0.5% to 7%, 0.5% to 8%, 0.5% to 9%, 0.5% to 10%, 0.5% to 15%, or 0.5% to 20% by volume of the adsorbent material which is formed into the sheet. In some embodiments, the binder is a thermally induced phase separated polyethylene. In some embodiments, the binder is thermally induced phase separated high-density polyethylene or a thermally induced phase separated ultra high molecular weight polyethylene.

In some embodiments, adsorbent particles are molecular sieves, activated alumina, zeolites, or activated carbon. In some embodiments, the adsorbent particles form at least 75%, 80%, 85%, 90%, 95%, 96%, 97%, 99%, or 99.5% by weight of said sheet. In some embodiments, the adsorbent particles form at least 30%, 35%, 40%, 45%, 50%, 55%, 60%, 65%, 70%, or 75%, by volume of adsorbent material which is formed into the sheet. In some embodiments, the adsorbent particles are interconnected by the polymer binder to form a self-supporting porous adsorbent. In some embodiments, at least 20%, at least 30%, at least 40%, at least 50%, at least 60%, at least 70%, at least 80%, at least 90%, at least 95% or at least 100% of the adsorbent particles are interconnected by the polymer binder. In some embodiments, the binder forms elongated sections with a mean length to diameter ratio of greater than or equal to 1/2, 2/1, 5/1, 10/1, 50/1, 100/1 or 200/1. In some embodiments, the binder forms a thermoplastic network with said particles, wherein said network has porosity.

In one embodiment, a parallel passage contactor (PPC) structure is provided, comprising one or more self-supported adsorbent sheets arranged in multiple, overlapping layers mechanically spaced to allow gas flow between said layers from one end of the structure to the other, wherein said one or more adsorbent sheets comprises adsorbent particles, a polymer binder, and reinforcement fibers. In some embodiments, the PPC structure is configured for use in pressure swing adsorption (PSA), pressure and temperature swing adsorption (PTSA), or vacuum pressure swing adsorption (VPSA).

In some embodiments, the PPC structure is configured for use in removal of gaseous contaminants (including, but not limited to, carbon dioxide ($CO_2$), carbon monoxide (CO), volatile organic compounds (VOCs), chemical or biological toxicants, sulfur dioxide, hydrogen sulfide, chlorinated compounds or water vapor). Non-limited applications include generating an air stream, including, but not limited to, enclosed spaces. Markets that can benefit from the disclosed apparatus and method include, but are not limited to, diesel-electric powered submarines, nuclear submarines, safety shelters (CBRN—chemical, biological, radiological, and nuclear), hyperbaric chambers, powered mine shelters, industrial gas separation and purification processes, and other industrial gas adsorbent systems, and rebreather systems, such as SCUBA rebreathers, personnel protection systems and firefighter rebreathers.

In some embodiments, reinforcement fibers can be carbon fibers (activated or non-activated), aramid fibers, glass fibers, or other fibers that would structurally reinforce the adsorbent sheet. In some embodiments, the reinforcement fibers are carbon fibers. In some embodiments, the carbon fibers can be activated carbon fiber or non-activated carbon fibers. In some embodiments, the carbon fibers are activated carbon fibers. In some embodiments, the fibers are aramid fibers. In some embodiments, the aramid fibers are carbonized aramid fibers. In some embodiments, the reinforcement fibers have a mean length of greater than 100 microns on their longest side, a mean length of not greater than 0.01 inches on their longest side, a mean length of not greater than 0.02 inches on their longest side, a mean length of not greater than 0.03 inches on their longest side, or a mean length on their longest side of not greater than 50%, 40%, 30%, 20%, 10%, 5%, 4%, 3%, 2%, or 1% of the thickness of the adsorbent sheet. In some embodiments, the reinforcement fibers have a mean length of 10 um to 250 um, 10 um to 200 um, 10 um to 100 um, or 15 to 100 um on their longest side. In some embodiments, the reinforcement fibers are no more than about 50%, no more than about 40%, no more than about 30%, no more than about 20%, no more than about 10%, no more than about 5%, no more than about 2%, no more than about 1% by weight of the adsorbent sheet. In some embodiments, the reinforcement fibers are no more than about 50%, no more than about 40%, no more than about 30%, no more than about 20%, no more than about 10%, no more than about 5%, no more than about 2%, no more than about 1% by volume of the adsorbent material which is formed into said sheet. The reinforcement fibers may be incorporated into the adsorbent material, including into the integral adsorbent retention layer. In one embodiment, the reinforcement fibers are incorporated only into the adsorbent material and in another embodiment, the reinforcement fibers are incorporated only into the integral adsorbent retention layer. Reinforcement fibers may increase the mechanical strength and durability of the adsorbent material. For example, the matrix tensile strength, the compressive strength, or compressive modulus of the adsorbent material may be substantially increase by the addition of reinforcement fibers. The reinforcement fibers may be added at any suitable time in the process of making the adsorbent material, including during the mixing process, during the extrusion process, during the cooling and thermally induced phase separation process, during the calendaring process, and the like.

In some embodiments, wherein said adsorbent sheets have substantially parallel ribs disposed on said one or more sheets, which mechanically space said layers to allow gas flow. In some embodiments, the parallel contactor structure comprises a single adsorbent sheet, which is spirally wound, having substantially parallel ribs disposed on said sheet, wherein said ribs mechanically space said layers to allow gas flow.

In some embodiments, the PPC structure comprises: (a) a plurality of parallel, non-wound adsorbent surfaces, mechanically spaced so as to allow gas flow between each surface in the plurality; and (b) one or more fasteners, wherein the one or more fasteners secures the plurality of said surfaces together. In some embodiments, the cartridge comprises square adsorbent sheets arranged into a cube. In some embodiments, the cartridge comprises round or oval adsorbent sheets arranged into a cylinder. In some embodiments, the cartridge comprises triangular or trapezoidal sheets arranged into a solid block of adsorbent. In some embodiments, the cartridge comprises rectangular adsorbent sheets arranged into a rectangular stack. In some embodiments, the PPC structure can be arranged as shown in US 2011/0206572, which is incorporated herein by reference in its entirety. In some embodiments, the PPC structure can be arranged as shown in U.S. Pat. No. 5,964,221, which is incorporated herein by reference in its entirety.

The adsorbent particles may be any of the adsorbent particles described herein and may be of the sizes described herein.

In some embodiments, the binder is a polyethylene binder or other binder described herein. In some embodiments, the binder comprises 0.25% to 10%, 0.25% to 9%, 0.25% to 8%, 0.25% to 7%, 0.25% to 6%, 0.25% to 5%, 0.25% to 4%, 0.25% to 3%, 0.25% to 2%, or 0.25% to 1% by weight of said sheet. In some embodiments, the binder is high-density polyethylene or ultra high molecular weight polyethylene. In some embodiments, the binder comprises 0.5% to 1%, 0.5% to 2%, 0.5% to 3%, 0.5% to 4%, 0.5% to 5%, 0.5% to 6%, 0.5% to 7%, 0.5% to 8%, 0.5% to 9%, 0.5% to 10%, 0.5% to 15%, or 0.5% to 20% by volume of the adsorbent material which is formed into the sheet. In some embodiments, the binder is a thermally induced phase separated polyethylene. In some embodiments, the binder is thermally induced phase separated high-density polyethylene or a thermally induced phase separated ultra high molecular weight polyethylene.

In some embodiments, the reinforcement fibers allow the PPC structure to have a height of greater than 6 inches, or from 12 inches to 36 inches, from 12 inches to 48 inches, from 18 inches to 36 inches or 18 inches to 48 inches, or a height of 48 inches or less.

The absorbent may be a single absorbent or a mixture of different adsorbents. In some embodiments, the adsorbent includes, but is not limited to, calcium hydroxide ($Ca(OH)_2$), lithium hydroxide (LiOH), calcium hydroxide mixed with a percentage of sodium and potassium hydroxide, other $CO_2$ adsorbents and mixtures thereof. In some embodiments, the adsorbent (e.g., calcium hydroxide) is mixed with other alkali metal hydroxides such as sodium hydroxide or potassium hydroxide. In some embodiments, adsorbent particles are molecular sieves, activated alumina, zeolites, or activated carbon. In some embodiments, the adsorbent particles form at least 75%, 80%, 85%, 90%, 95%, 96%, 97%, 99%, or 99.5% by weight of said sheet. In some embodiments, the adsorbent particles form at least 30%, 35%, 40%, 45%, 50%, 55%, 60%, 65%, 70%, or 75%, by volume of adsorbent material which is formed into the sheet. In some embodiments, the adsorbent particles are interconnected by the polymer binder to form a self-supporting porous adsorbent. In some embodiments, at least 20%, at least 30%, at least 40%, at least 50%, at least 60%, at least 70%, at least 80%, at least 90%, at least 95% or at least 100% of the adsorbent particles are interconnected by the polymer binder.

In another embodiment, a parallel passage contactor structure is provided, comprising one or more self-supported adsorbent sheets arranged in multiple, overlapping layers mechanically spaced to allow gas flow between said layers from one end of the structure to the other, wherein said one or more adsorbent sheets comprises adsorbent particles selected from molecular sieves, activated alumina, zeolites, or activated carbon, 0.1% to 5% by weight of a polyethylene binder, and 0.1 to 40% by weight of carbon or aramid fibers having a mean length of greater than 100 microns on their longest side, configured for use in pressure swing adsorption (PSA), pressure and temperature swing adsorption (PTSA), or vacuum pressure swing adsorption (VPSA). The fibers can be any of those described herein in any of the weight or volume percentages described herein. In some embodiments, the carbon fibers are activated carbon fibers. In some embodiments, the carbon fibers are non-activated carbon fibers. In some embodiments, the aramid fibers are carbonized aramid fibers. In some embodiments, the fibers are aramid fibers. In some embodiments, the fibers comprise 0.1% to 30%, 0.1% to 20%, 0.1% to 10% or 0.1% to 5% by weight of said sheet. In some embodiments, the polyethylene binder comprises 0.1% to 5%, 0.1% to 4%, 0.1% to 3%, 0.1% to 2% or 0.1% to 1% by weight of said sheet. In some embodiments, the fibers comprise 0.1% to 30%, 0.1% to 20%, 0.1% to 10% or 0.1% to 5% by volume of the adsorbent material which is formed into the sheet. In some embodiments, the polyethylene binder comprises 0.5% to 10%, 0.5% to 9%, 0.5% to 8%, 0.5% to 7%, 0.5% to 6%, 0.5% to 5%, 0.5% to 4%, 0.5% to 3%, 0.5% to 2% or 0.5% to 1% by volume of the adsorbent material which is formed into the sheet.

In one embodiment, a system is provided, comprising any of the parallel passage contactor structures or articles described herein. In some embodiments, the system is a pressure swing adsorption (PSA), pressure and temperature swing adsorption (PTSA), or vacuum pressure swing adsorption (VPSA) system. In some embodiments, the systems is for use in removal of gaseous contaminants (including, but not limited to, carbon dioxide ($CO_2$), carbon monoxide (CO), volatile organic compounds (VOCs), chemical or biological toxicants, sulfur dioxide, hydrogen sulfide, chlorinated compounds or water vapor). Non-limited applications include generating an air stream, including, but not limited to, enclosed spaces. Markets that can benefit from the disclosed apparatus and method include, but are not limited to, diesel-electric powered submarines, nuclear submarines, safety shelters (CBRN—chemical, biological, radiological, and nuclear), hyperbaric chambers, powered mine shelters, industrial gas separation and purification processes, and other industrial gas adsorbent systems, and rebreather systems, such as SCUBA rebreathers, personnel protection and personnel escape systems and firefighter rebreathers.

In some embodiments, self-supporting means that the article or structure means the sheet can hold its shape without need of a backing, laminate support, external support, or internal reinforcement.

In some embodiments, an article (which may be in the form of a parallel passage contactor) is provided, comprising:
 adsorbent particles;
 a polymer binder; and
 a plurality of integral channels;
 wherein the adsorbent particles are interconnected by the polymer binder to form a self-supporting porous adsorbent that is configured for forced fluid flow through said integral channels. The article has high strength and durability for demanding applications, such as pressure swing adsorption (PSA), pressure and temperature swing adsorption (PTSA), or vacuum pressure swing adsorption (VPSA). In some embodiments, the forced fluid flow comprises at least one gas molecule for adsorption and at least one gas for enrichment.

Also provided is an article (which may be in the form of a parallel passage contactor), comprising:
 adsorbent particles;
 an oriented polymer binder; and
 a plurality of integral channels;
 wherein the adsorbent particles are interconnected by the polymer binder to form a self-supporting porous adsorbent that is configured for forced fluid flow through said integral channels;
 wherein said article is made by a thermally induced phase separation process comprising the steps of:
 dissolving said polymer binder in a first solvent to form a mixture;
 adding and mixing adsorbent particles with said mixture to form an adsorbent slurry;
 extruding said adsorbent slurry to from an extrudate;
 cooling extrudate to cause thermally induced phase separation;
 forming said integral channels in said extrudate; and drying said extrudate.

Additionally provided is an article (which may be in the form of a parallel passage contactor) comprising an adsorbent sheet suitable for forced fluid flow consisting essentially of:
 adsorbent particles;
 a thermoplastic oriented polymer binder; and
 at least one integral channel;
 wherein the adsorbent particles are interconnected by the polymer binder to form a self-supporting porous adsorbent that is configured for forced fluid flow through said channel.

In another embodiment, an article (which may be in the form of a parallel passage contactor) is provided comprising a fluid enrichment device comprising:
 1) an adsorbent pack comprising one or more adsorbent sheets comprising:
 adsorbent particles;
 an oriented polymer binder; and
 a plurality of integral channels; wherein the adsorbent particles are interconnected by the polymer binder to form a self-supporting porous adsorbent that is configured for forced fluid flow through said integral channels;
 2) a housing;
 wherein the adsorbent pack is at least partially enclosed by the housing, and wherein the housing is configured for fluid flow there through.

In some embodiments, the adsorbent sheet described herein is self-supporting having a porous structure of adsorbent particles interconnected by a polymer binder. The polymer binder may be oriented between adsorbent particles and be elongated having an aspect ratio of at least 2:1. In one embodiment, the adsorbent material is made by a thermally induced phase separation process. The adsorbent sheet can be arranged to form a plurality of integral channels. Adsorbent sheets may be configured into an adsorbent pack or cartridge, and a fluid, such as a gas, may be forced through the adsorbent pack. In one application, an adsorbent pack is configured in a pressure swing adsorption process where a gas is passed through the integral channels of the adsorbent pack, and the pressure is changed throughout the process. At least one gas molecule may be adsorbed by the adsorption particles and one or more gas molecules of a different type may pass through the adsorbent pack. A gas may be enriched by passing the gas through the adsorbent pack, wherein at least one of the gases is increased in concentration by at least one molecule as the gas passes through the adsorbent pack described herein.

The adsorbent material described herein may be substantially liquid resistant, and/or substantially water resistant. Any suitable fluid, such as a gas or liquid may be passed through the integral channels of the adsorbent pack, or over the adsorbent material described herein. The adsorbent sheet may be non-permeable, having substantially no bulk air flow through the material. For example, in one embodiment, the adsorbent material is a sheet having a Gurley Densometer time of more than 100 seconds (e.g., as measured on a Gurley Densometer, Model 4340).

In some embodiments, the adsorbent material comprises adsorbent particles interconnected with polymer binder. Any number and type of adsorbent particles may be used. The adsorbent particles may have any suitable shape and size and are typically no more than about 250 um in size. One or more types of adsorbent particles may be incorporated into the adsorbent material in any suitable ratio, or weight percentage.

The adsorbent material comprises polymer binder that interconnects the adsorbent particles by contacting the adsorbent particles and extending to another adsorbent particle. The polymer may be branched between the adsorbent particles as defined herein. Any suitable percentage of the adsorbent particles may be interconnected with the polymer such as, but not limited to, at least about 20%, at least about 30%, at least about 40%, at least about 50%, at least about 60%, at least about 70%, at least about 80%, at least about 90%, at least about 95%, at least about 99%, and between and including any of the values provided. The adsorbent sheet material made by a thermally induced phase separation process having a uniquely high percentage of adsorbent particles interconnected with polymer, such as at least about 50% or more.

The adsorbent particles may be any suitable size including, but not limited to, no more than about 200 um (um=micrometer or micron), no more than about 100 um, no more than about 50 um, no more than about 25 um, no more than about 10 um, no more than about 5 um, and any range between and including the size dimensions provided. In some embodiments, the adsorbent particles have a mean particle size of greater than 200 nm. The adsorbent particles may comprise any type or combination of suitable materials, including inorganic compounds, zeolites, activated carbon, molecular sieves, and the like. In some embodiments, the adsorbent particles are calcium hydroxide, lithium hydroxide, or calcium hydroxide mixed with a percentage of sodium and potassium hydroxide. In some embodiments the adsorbent particles are. In some embodiments, the adsorbent particles are not calcium hydroxide or lithium hydroxide particles. In some embodiments, the adsorbent particles consist essentially of one type of adsorbent material.

The polymer binder may be any suitable type or combination of materials including, but not limited to, thermoplastics, soluble polymers, ultra high molecular weight polymers, ultra high molecular weight polyethylene, polytetrafluoroethylene, urethane, elastomer, fluoroelastomer and the like. In some embodiments, the polymer binder may be oriented, wherein it is elongated between, and interconnects adsorbent particles and has an aspect ratio of at least 2:1. Oriented polymer may significantly increase the strength of the adsorbent material. Any suitable percentage of the polymer binder may be oriented as defined herein, including, but not limited to, at least about 10%, at least about 40%, at least about 50%, at least about 60%, at least about 70%, and any range between and including the values provided. In one embodiment, the polymer binder is substantially oriented, wherein at least 70% of the polymer is oriented. The oriented polymer may have any suitable aspect ratio, including but not limited to, greater than about 2:1, greater than about 3:1, greater than about 5:1, greater than about 10:1, greater than about 25:1, greater than about 40:1, greater than about 50:1, and any range between and including the aspect ratios provided. In addition, the oriented polymer may have any suitable diameter or maximum cross length dimension including, but not limited to, no more than about 5 um, no more than about 2 um, no more than about 1 um, no more than about 0.5 um, and any range between and including the dimensions provided.

The oriented polymer binder may be substantially aligned in the same direction, wherein the long axis of the oriented polymer binder are all substantially aligned. For example, in one embodiment the adsorbent material comprises oriented polymer binder that is substantially aligned in the processing direction of the material.

The polymer content of the adsorbent material may be any suitable percentage by weight including, but not limited to, no more than about 10%, no more than 8%, no more than 5%, no more than 4%, no more than 3%, no more than 2%, no more than 1%, no more than 0.6%, and any range between and including any of the provided percentages by weight. In some embodiment, the polymer binder is between 0.5 to 2%, 0.5 to 3% or 0.5 to 4% by weight. Low concentration of polymer means a higher concentration of adsorbent particles which may increase adsorption capabilities including rate and quantity.

The adsorbent material is porous, allowing for the diffusion of gas into the structure whereby specific gas molecules may be adsorbed by the adsorbent particles. The adsorbent may have any suitable porosity including, but not limited to, more than about 5%, more than about 10%, more than about 20%, more than about 30%, more than about 50%, more than about 60%, more than about 70%, more than about 80%, more than about 90%, more than about 95%, and any range between and including the percentages provided. Likewise the adsorbent material may have any suitable density including, but not limited to, no more than about 2 g/cc, no more than about 1.5 g/cc, no more than about 1 g/cc, no more than about 0.75 g/cc, no more than about 0.5 g/cc, no more than about 0.3 g/cc, no more than about 0.2 g/cc, and any range between and including the densities provided. The density of the adsorbent material will be affected by the adsorbent particle type, concentration and porosity of the adsorbent material.

The adsorbent sheet may have a first surface and a second surface and any suitable thickness including, but not limited to, no more than about 1 mm, no more than about 2 mm, no more than about 4 mm, no more than about 6 mm, and the like. The adsorbent sheet may be a continuous sheet of material having a length greater than about 3 meter, greater than about 10 m, greater than about 100 m, greater than about 1,000 m, and any range between and including the lengths provided.

The adsorbent sheet may comprise a plurality of integral channels, having the same or different dimensions. In one embodiment, the channels are only on one side of the sheet, and in another embodiment the channels are on both sides of the sheet. The channels may be aligned with the processing direction of the adsorbent sheet material, or may be configured at an angle to the processing direction, such as perpendicular to the procession direction. The channels may be linear, may be curved, or may be configured with at least a portion that is curved. The channels may be branched or may intersect each other along the length of the adsorbent material. The channels may have a depth that is any suitable percentage of the overall thickness of sheet including but not limited to, more than about 20%, more than about 40%, more than about 50%, more than about 60% more than about 70%, more than about 80%, and any range between and including the percentages provided. The channels may have a width of any suitable ratio to the depth dimension including, but not limited to, more than about 0.5:1, more than about 0.75:1, more than about 1:1, more than about 1.5:1, more than about 2:1, more than about 3:1, more than about 4:1, and any range between and including the ratios provided. In one embodiment, the channels may be uniform along the channel length, such as from the inlet to the outlet of the adsorbent pack. In another embodiment, the flow channels may have a cross sectional area that varies along the length of the channel, such as from the inlet to the outlet. In yet another embodiment, the channels may all have substantially the same configuration along the length of the channel, such as a rectangular shape that is linear, for example. In still another embodiment, the channels may have different configurations along the length of the channel, but may have substantially the same pressure drop from the inlet to the outlet. Any number of different configurations of channels and combinations of configurations described herein have been envisioned.

The adsorbent sheet may further comprise an integral adsorbent retention layer on at least one surface, and may be on both surfaces. In one embodiment, the integral adsorbent retention layer is not within the surface of the integral channels described herein. An integral adsorbent retention layer is a thin layer of partially occluded pores on the surface of an adsorbent sheet. The integral adsorbent retention layer may comprise smeared polymer binder material and adsorbent material. In one embodiment, the integral adsorbent retention layer consists essentially of polymer binder and may be smeared or comprise a thin film layer of polymer binder. The integral adsorbent retention layer may occlude any suitable percentage of the surface of the adsorbent material including but not limited to no more than about 90%, no more than about 80%, no more than about 70%, no more than about 60%, no more than about 50%, no more than about 40%, and any range between and including any of the percentages provided. The integral adsorbent retention layer may have open areas having any suitable nominal pore size including but not limited to no more than about 50 um, no more than about 25 um, no more than about 10 um, no more than about 5 um, no more than about 3 um, no more than about 2 um, no more than about 1 um, and any range between and including any of the pore sizes provided. The integral adsorbent retention layer may have any suitable thickness including but not limited to, no more than about 5 um, no more than about 3 um, no more than about 2 um, no more than about 1 um, no more than about 0.75 um, no more than about 0.5 um, and any range between and including the thickness values provided.

The adsorbent sheets described herein may be made into a adsorbent pack, including adsorbent cartridges having a height and diameter. In another embodiment, the adsorbent sheets may be stacked, folded, pleated or otherwise configured into an adsorbent pack. The adsorbent pack may be in the form of a sheet arranged to form a plurality of integral channels, and the sheet may be spirally wound to create an adsorbent pack having a plurality of flow paths, or channels there through. In another embodiment, discrete sheets of adsorbent material may be stacked with integral channels configured and aligned to provide a flow path through the pack. An adsorbent pack may be used to enrich a gas by passing a fluid through the integral channels having a first gas that is adsorbed, and a second gas or multiple other gases that are not adsorbed or are less strongly adsorbed. The adsorbent material may be selected to either only adsorb a particular gas molecule or adsorb much more of, or at a higher rate, a specific gas molecule.

The adsorbent packs as described herein may be used in any adsorption and/or enrichment process. In one embodiment, the adsorbent pack is configured for pressure swing adsorption processes. Pressure swing adsorption process may have any suitable flow rate and pressure range. The adsorbent pack of the present invention may be made to fit directly into existing adsorbent housings or into frames which can accept and seal adsorbent packs into existing pressure vessels.

The adsorbent material and pack of the present invention may be made through any suitable set of procession steps. In one embodiment, the adsorbent sheet, as described herein, is made by a thermally induced phase separation process by dissolving a polymer binder in a first solvent (e.g., mineral oil) at elevated temperature to form a mixture, adding and mixing adsorbent particles with the mixture to form an adsorbent slurry, extruding the adsorbent slurry to form an extrudate or sheet, cooling the extrudate to induce thermally induced phase separation, forming integral channels in the extrudate, using a second solvent to remove said first solvent, and drying said extrudate to form an adsorbent sheet having integral channels. The channels may be formed in the adsorbent sheet through any suitable process. For example, an extrudate may be passed through a calendaring roll having a profile that forms integral channels in the sheet as it passes there through. In another embodiment, discrete sheets may be pressed with a platen to form the integral channels. In yet another embodiment, integral channels may be machined into an adsorbent sheet before or after it is dried. For example, a series of grinding wheels may be used to remove adsorbent material from a sheet and therein form the adsorbent sheet with integral channels.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention

DETAILED DESCRIPTION

Certain exemplary embodiments of the present invention are described herein and illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention. The embodiments depicted in the Figures are embodiments and are not limiting. It is intended that the embodiments described herein can be combined in any suitable combination as if written in multiply dependent claims.

Figure 1A:
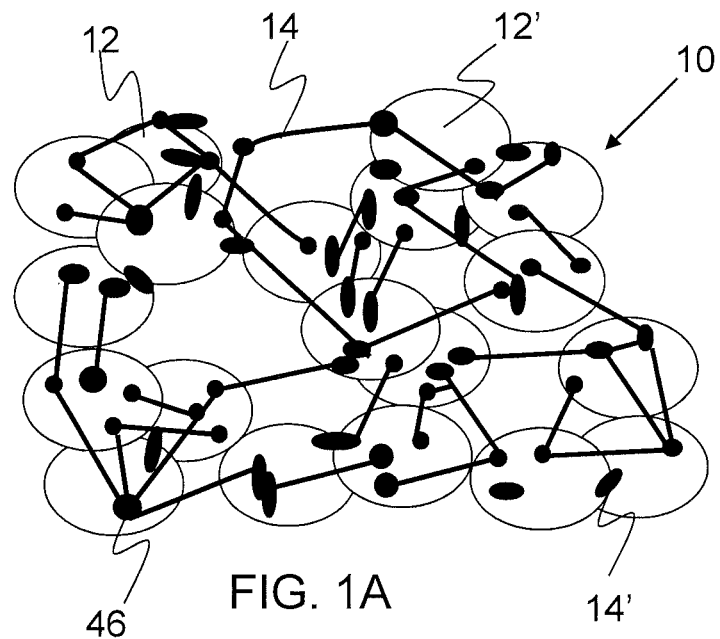
FIG. 1A shows a schematic of the adsorbent material as described herein.

The adsorbent material 10 of the present invention comprises adsorbent particles 12, 12' interconnected with polymer binder 14, 14' as shown in FIG. 1A. Some of the polymer binder may contact both adsorbent surfaces as shown in 14' and may not be oriented as described herein. The adsorbent material 10 comprises polymer binder 14 that interconnects the adsorbent particles 12 by contacting the adsorbent particles and extending to another adsorbent particle 12', as shown in FIG. 1A. The polymer binder 14 may be branched wherein a first portion of polymer may be connected with a second portion of polymer between two or more particles, as show in FIG. 1B. Any suitable percentage of the adsorbent particles may be interconnected with the polymer as described herein. A higher concentration of adsorbent particles may provide improved adsorption performance. In one embodiment, the adsorbent material is made by a thermally induced phase separation process, and comprises a uniquely high percentage of adsorbent particles by mass or volume relative to polymer content, and interconnected with said polymer.

Figure 1B:
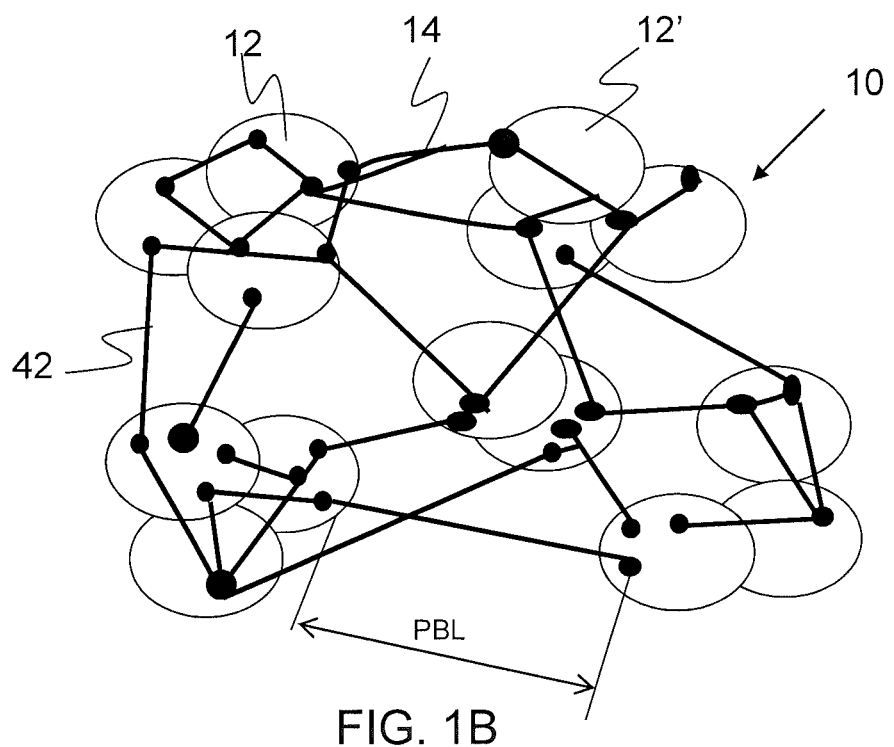
FIG. 1B shows a schematic of the adsorbent material comprising oriented polymer binder as described herein.
Figure 1C:
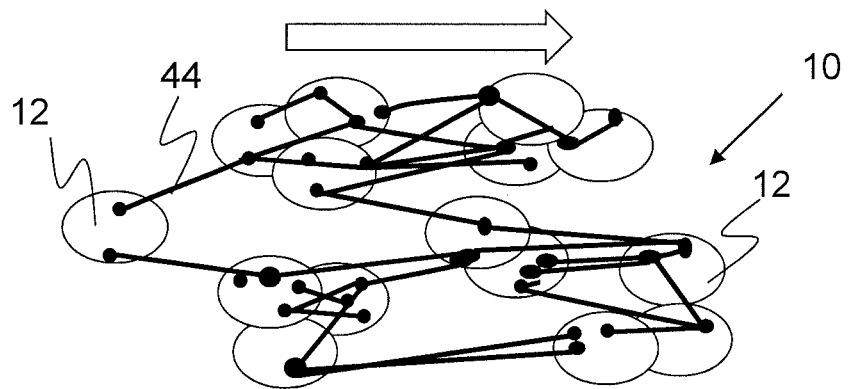
FIG. 1C shows a schematic of the adsorbent material comprising aligned oriented polymer binder as described herein.

As shown in FIGS. 1A, and 1B, substantially all of the adsorbent particles are interconnected by polymer binder. In addition, as shown in FIG. 1B, some of the polymer binder is oriented polymer binder 42, wherein it is elongated between and interconnecting adsorbent particles, and has an aspect ratio of at least 2:1 where the length of the oriented polymer is shown as PBL in FIG. 1B. Furthermore, as shown in the cross sectional schematic of the adsorbent material in FIG. 1C, the oriented polymer binder is aligned, or oriented substantially in the same direction, with a majority of the oriented polymer binder being elongated in substantially the same direction. Substantially the same direction, as used herein, means within a 30 degree inclusive angle of the average oriented polymer binder direction. The arrow over the adsorbent material in FIG. 1C represents the process direction of the material. This aligned orientation of the polymer binder may be imparted during the processing of the material, such as during extrusion, roll to roll transfer between process steps, during calendaring, during integral channel formation, or during a separate process step where the adsorbent material may be elongated. Additionally, the polymer binder may be oriented in the same plane as the machine direction, but perpendicular to the machine direction.

Any number and type of adsorbent particles may be used. The adsorbent particles may have any suitable shape and size. One or more types of adsorbent particles may be incorporated into the adsorbent material in any suitable ratio, or weight percentage. The adsorbent particles may be any suitable size including, but not limited to, no more than about 200 um, no more than about 100 um, no more than about 50 um, no more than about 25 um, no more than about 10 um, no more than about 5 um, and any range between and including the size dimensions provided. The adsorbent particles may comprises any type or combination of suitable materials, including inorganic compounds, zeolites, activated carbon, lithium hydroxide, calcium hydroxide, molecular sieves, 13× and the like. In some embodiments, the adsorbent particles consist essentially of one type of adsorbent material.

The polymer binder may be any suitable type or combination of materials including, but not limited to, thermoplastics, soluble polymers, ultra high molecular weight polymers, ultra high molecular weight polyethylene, polytetrafluoroethylene, urethane, elastomer, fluoroelastomer and the like. Oriented polymer binder may significantly increase the strength of the adsorbent material. Any suitable percentage of the polymer binder may be oriented as defined herein, including, but not limited to, at least about 10%, at least about 40%, at least about 50%, at least about 60%, at least about 70%, and any range between and including the values provided. In one embodiment, the polymer binder is substantially oriented, wherein at least 70% of the polymer is oriented as shown in FIG. 1B. The oriented polymer may have any suitable aspect ratio, including but not limited to, greater than about 2:1, greater than about 3:1, greater than about 5:1, greater than about 10:1, greater than about 25:1, greater than about 40:1, greater than about 50:1, greater than 100:1 and any range between and including the aspect ratios provided. In addition, the oriented polymer may have any suitable diameter or maximum cross length dimension including, but not limited to, no more than about 2 um, no more than about 1 um, no more than about 0.5 um, and any range between and including the dimensions provided.

The polymer content of the adsorbent material may be any suitable percentage by weight including, but not limited to, no more than about 10%, no more than about 8%, no more than about 5%, no more than about 4%, no more than about 3%, no more than about 2%, no more than about 1%, no more than about 0.6%, and any range between and including any of the provided percentages by weight. Low concentration of polymer means a higher concentration of adsorbent particles which may increase adsorption capabilities including rate and quantity.

The adsorbent material 10 is porous, allowing for the diffusion of gas into the structure whereby specific gas molecules may be adsorbed by the adsorbent particles. The adsorbent may have any suitable porosity including, but not limited to, more than about 5%, more than about 10%, more than about 20%, more than about 30%, more than about 50%, more than about 60%, more than about 70%, more than about 80%, more than about 90%, more than about 95%, and any range between and including the percentages provided. The adsorbent material may be non-permeable, having substantially no bulk air flow through the material. For example, in one embodiment, the adsorbent material is a sheet having a Gurley Densometer, Model 4340 automatic Gurley Densometer time of more than 100 seconds, as defined herein, or more than 25 seconds, or more than 50 seconds, or more than 200 seconds, or more than 300 seconds, or more than 400 seconds. In some embodiments, the adsorbent sheet may have a reduced Gurley time of less than 100 seconds (e.g., in some embodiments, the sheet may comprise reinforcement fibers which may open up the spacing between adsorbent particles). The adsorbent sheet described herein is self-supporting having a porous structure of adsorbent particles interconnected by polymer binder. As used herein, the term self-supporting in reference to the adsorbent material, means that the material is free-standing, or can be handled without falling apart. Adsorbent packed beds for example would not be self-supporting, as the adsorbent particles are loose and require some external reinforcement or housing.

For packing of one size of spheres, the maximum theoretical packing is 64% (36% void). Those skilled in the use of 13× molecular sieve beads with a 4 to 8 mesh bead sieve size, find that with proper filling of beads in a packed bed, one can achieve an inter bead void volume of about 40%. Packing densities of fine powders to produce spheres or adsorbents of the present invention, varies by the amount of compaction or processing that has occurred, and also by the shapes and sizes of the particles, which changes the interparticle void volume.

In tests using thermally induced phase separation of ultra high molecular weight polyethylene to produce calcium hydroxide sheets, the interparticle void space as determined by oil content before extraction is 68.0% void space. However after extracting this oil with a solvent, and heating and removing the solvent, the adsorbent sheet shrinks 18.3% by volume. If the maximum packing density of calcium hydroxide powder has a void volume of 40%, then if one starts with 68% void space, then 28% extra void volume is over and above the maximum packing density form. If the total volume of the adsorbent sheet shrinks by 18%, and this can only be accomplished by reducing the extra void volume, then 18% divided by the initial 28% extra void volume, results in shrinking the extra void volume by 64%. Even with this shrinkage, increased inter-particle void volume is still achieved. In some embodiment, the fiber reinforcement reduces the extra void space shrinkage, opening up the inter-particle spacing and improving the macro-diffusion of gases in the adsorbent structure. This may result in adsorbents that have reduced gurley numbers, and increased utilization of adsorbent particles contained in said adsorbent sheets.

Figure 2A:
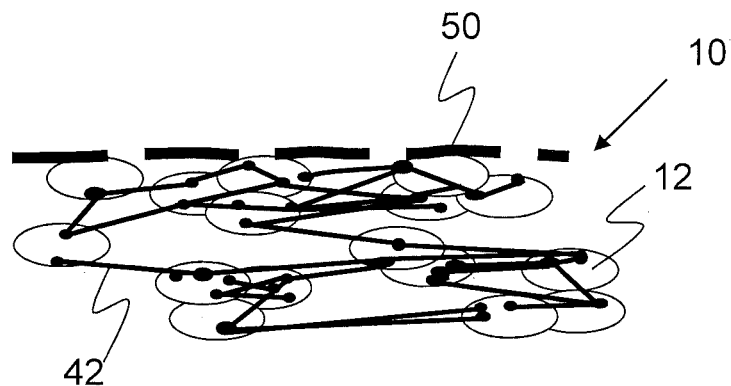
FIG. 2A shows a cross-sectional schematic of the adsorbent material comprising an integral adsorbent retention layer as described herein.
Figure 2B:
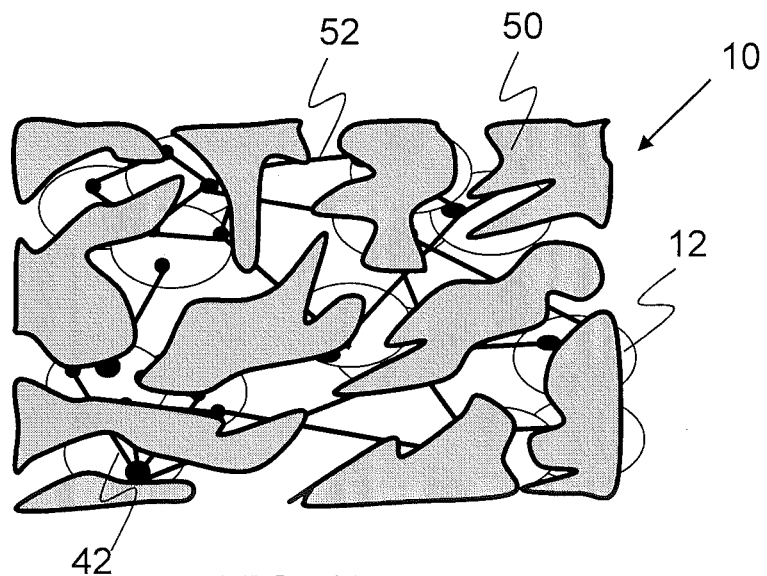
FIG. 2B shows a surface schematic of the adsorbent material comprising an integral adsorbent retention layer described herein.

The adsorbent sheet may further comprise an integral adsorbent retention layer 50 on at least one surface, and may be on both surfaces as depicted in FIGS. 2A and 2B. In one embodiment, the integral adsorbent retention layer is not within the surface of the integral channels described herein. An integral adsorbent retention layer is a thin layer of material on the surface of an adsorbent sheet. As shown in FIG. 2A and FIG. 2B, the integral adsorbent retention layer 50 is very thin and discontinuous having openings 52 between portion of the integral adsorbent retention layer. The openings 52 may be continuous as depicted in FIG. 2B, and/or discrete, wherein they are defined by an outer boundary of the integral adsorbent retention layer, such as a hole in the integral adsorbent retention layer. The integral adsorbent retention layer may comprise smeared polymer binder material and adsorbent material. In one embodiment, the integral adsorbent retention layer consists essentially of polymer binder and may be smeared or comprise a thin film layer of polymer binder. The integral adsorbent retention layer may occlude any suitable percentage of the surface of the adsorbent material including but not limited to no more than about 90%, no more than about 80%, no more than about 70%, no more than about 60%, no more than about 50%, no more than about 40%, and any range between and including any of the percentages provided. The integral adsorbent retention layer may comprise openings 52 having any suitable nominal pore size including but not limited to no more than about 100 um, no more than about 50 um, no more than about 25 um, no more than about 10 um, no more than about 5 um, no more than about 3 um, no more than about 2 um, no more than about 1 um, and any range between and including any of the pore sizes provided. The integral adsorbent retention layer may have any suitable thickness including but not limited to, no more than about 5 um, no more than about 3 um, no more than about 2 um, no more than about 1 um, no more than about 0.75 um, no more than about 0.5 um, and any range between and including the thickness values provided.

Figure 3A:
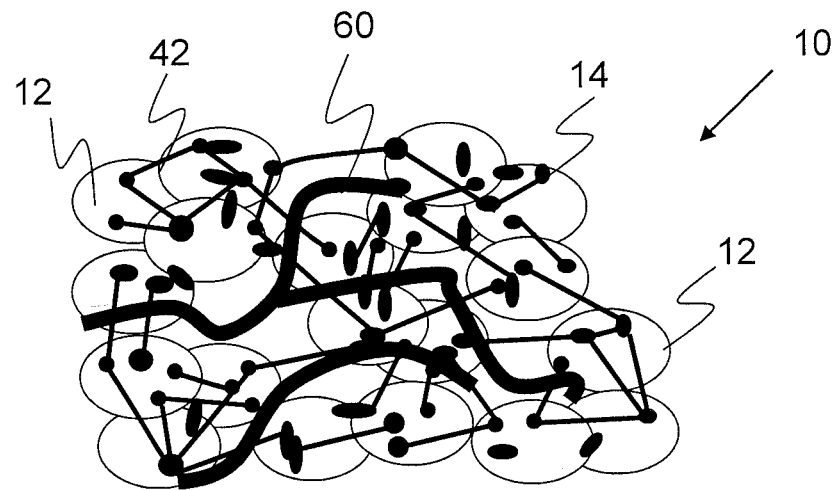
FIG. 3A shows a surface schematic of the adsorbent material comprising reinforcement fibers as described herein.
Figure 3B:
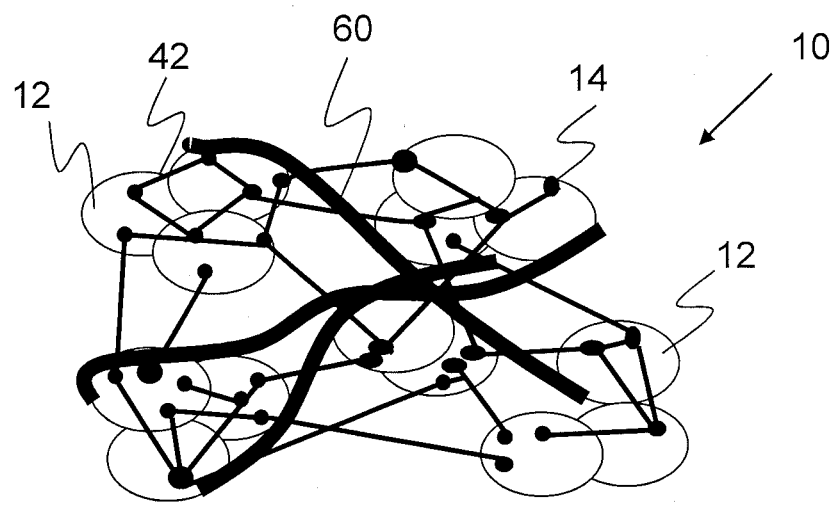
FIG. 3B shows a cross-section schematic of the adsorbent material comprising reinforcement fibers as described herein.

In some embodiments, the adsorbent material may further comprise reinforcement fibers 60 that may be incorporated into the adsorbent material as depicted in FIGS. 3A and 3B. The reinforcement fibers may be incorporated into any portion of the adsorbent material including into the integral adsorbent retention layer. As depicted in the surface schematic of FIG. 3A, the reinforcement fibers may be disposed within the adsorbent material, and intertwine with the polymer binder and adsorbent particles. The reinforcement fibers may be concentrated within a plane of a sheet of adsorbent material, such as on one surface. As shown in FIG. 3B, the cross-section schematic depicts reinforcement fibers extending through the thickness of the adsorbent material. The reinforcement fibers may have a concentration gradient with the adsorbent material, such as being concentrated on the surfaces and or within the center of the thickness of the adsorbent material. Reinforcement fibers may increase the mechanical strength and durability of the adsorbent material. For example, the compressive strength may be improved with reinforcing fibers, even when increasing the distance between powder particles, thereby reducing adsorbent material density, and reducing macro diffusion resistance between adsorbent particles (by increasing the void space between particles.

Any suitable amount of reinforcement fibers may be included into the adsorbent material, and may comprise any suitable weight percentage of the adsorbent material including, but not limited to, no more than about 50%, no more than about 40%, no more than about 30%, no more than about 20%, no more than about 10%, no more than about 5%, no more than about 2%, no more than about 1%, and any range between and including the weight percentages provided. The reinforcement fibers may have any suitable length and cross-length dimension, such as diameter or width. The length of the reinforcement fiber may be any suitable length including, but not limited to, no more than about 0.01 mm no more than about 0.05 mm, no more than about 0.10 mm, no more than about 0.25 mm, no more than about 0.5 mm, no more than about 0.75 mm, no more than about 1 mm, no more than about 2 mm, no more than about 4 mm, no more than about 8 mm, and any range between and including the lengths provided. The width or maximum cross-length dimension may be any suitable dimension including, but not limited to, no more than about 0.1 um, no more than about 1 um no more than about 5 um, no more than about 20 um, no more than about 50 um, no more than about 100 um, no more than about 500 um, and any range between and including the lengths provided. The reinforcement fibers may be added at any suitable time in the process of making the adsorbent material, including during the mixing process, during the extrusion process, during the calendaring process, and the like.

Figure 4A:
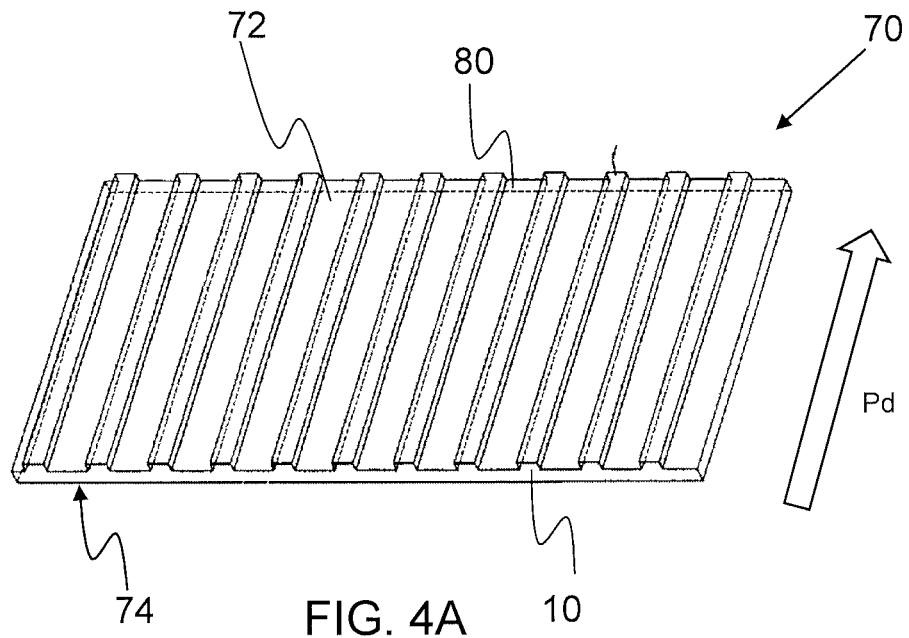
FIG. 4A shows an isometric view schematic of the adsorbent material comprising integral channels as described herein.
Figure 4B:
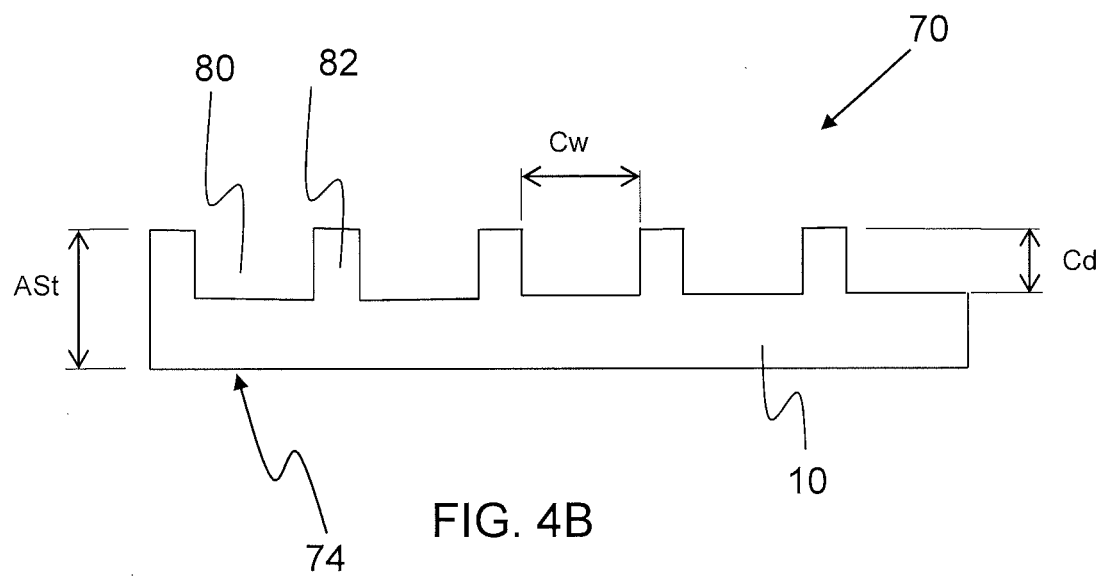
FIG. 4B shows a cross-section schematic of the adsorbent material comprising integral channels as described herein.

The adsorbent material 10 may be formed into a sheet 70 as shown in FIGS. 4A and 4B, having a first surface 72 and a second surface 74 and any suitable thickness ASt including, but not limited to, no more than about 1 mm, no more than about 2 mm, no more than about 4 mm, no more than about 6 mm, and any range between and including the thickness values provided. The adsorbent sheet may be a continuous sheet of material having a length greater than about 3 meter, greater than about 10 m, greater than about 100 m, greater than about 1,000 m, and any range between and including the lengths provided.

Figure 5:
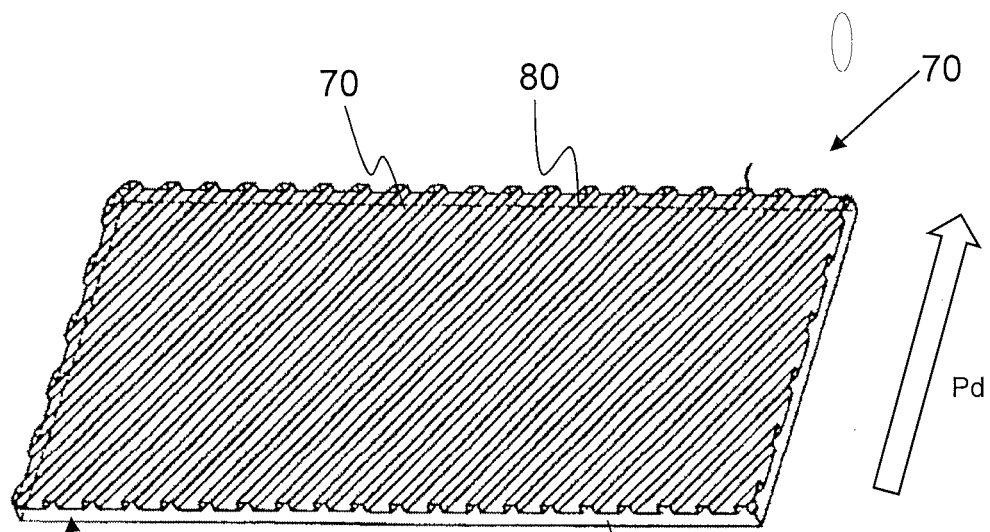
FIG. 5 shows an isometric view schematic of the adsorbent material comprising integral channels at offset angles as described herein.
Figure 6A:
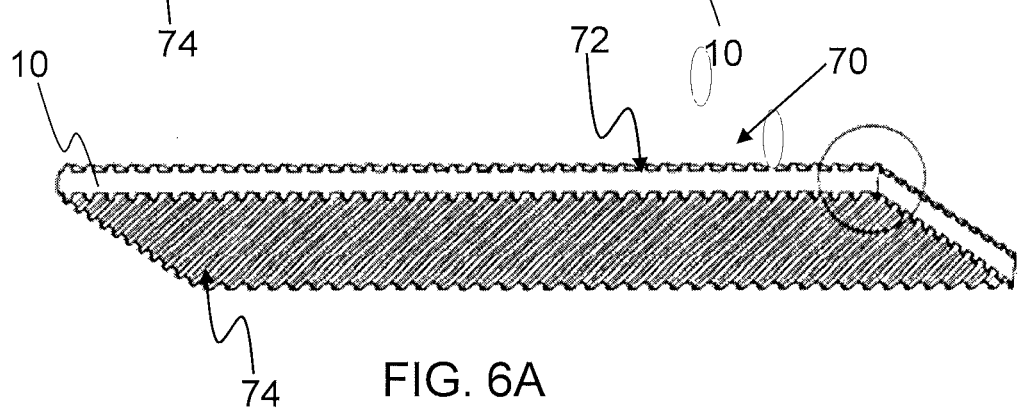
FIG. 6A shows an isometric view schematic of the adsorbent material comprising integral channels on both the first and second surface of the adsorbent material as described herein.
Figure 6B:
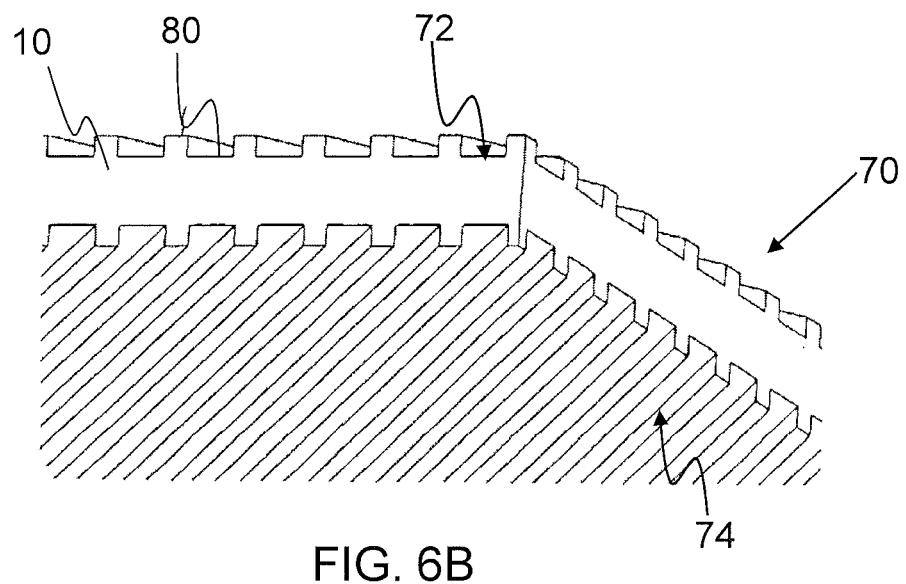
FIG. 6B shows an enlarged view of the isometric view schematic of FIG. 6A.

The adsorbent sheet may comprise a plurality of integral channels 80, having the same or different dimensions. The channels may have any suitable width Cw and depth Cd as depicted in FIG. 4B. A rib 82 may separate channels as depicted in FIG. 4B. An integral channel, as used herein, refers to a flow path into and out of the adsorbent pack or cartridge. In some embodiments, no additional spacers may be required. In one embodiment, the channels are only on one side of the sheet, and in another embodiment, the channels are on both sides of the sheet as shown in FIGS. 6A and 6B. The channels may be aligned with the processing direction Pd of the adsorbent sheet 70 as shown in FIG. 4A, or may be configured at an angle to the processing direction Pd as shown in FIG. 5. The channels may be configured in any suitable orientation to the process directions, such as in the process machine direction, or in the cross-machine direction. The channels may be linear or may be curved or may be configured with at least a portion that is curved. The channels may be branched or may intersect each other along the length of the material. The channels may have a depth that is any suitable percentage of the overall thickness of sheet including but not limited to, more than about 20%, more than about 40%, more than about 50%, more than about 60% more than about 70%, more than about 80%, and any range between and including the percentages provided. The channels may have a width of any suitable ratio to the depth dimension including, but not limited to, more than about 0.5:1, more than about 0.75:1, more than about 1:1, more than about 1.5:1, more than about 2:1, more than about 3:1, more than about 4:1, and any range between and including the ratios provided. Any number of different configurations of channels and combinations of configurations described herein have been envisioned.

Figure 7:
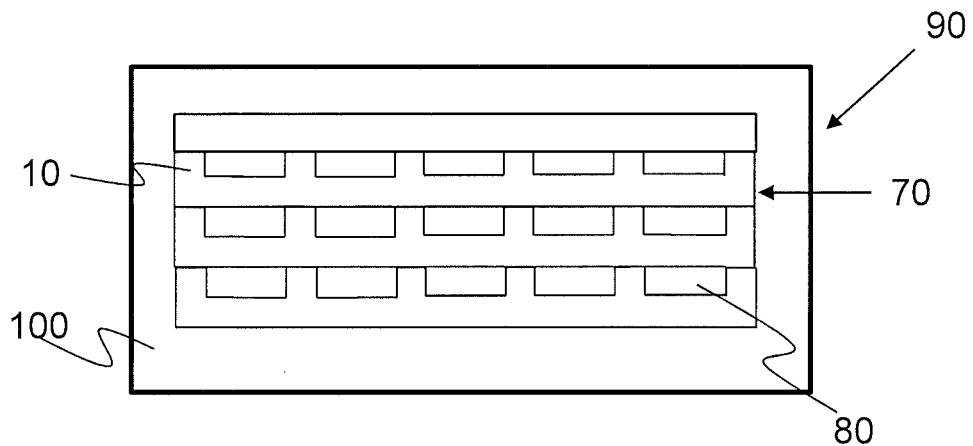
FIG. 7 shows a cross-section view of a adsorbent pack in a housing as described herein.
Figure 8:
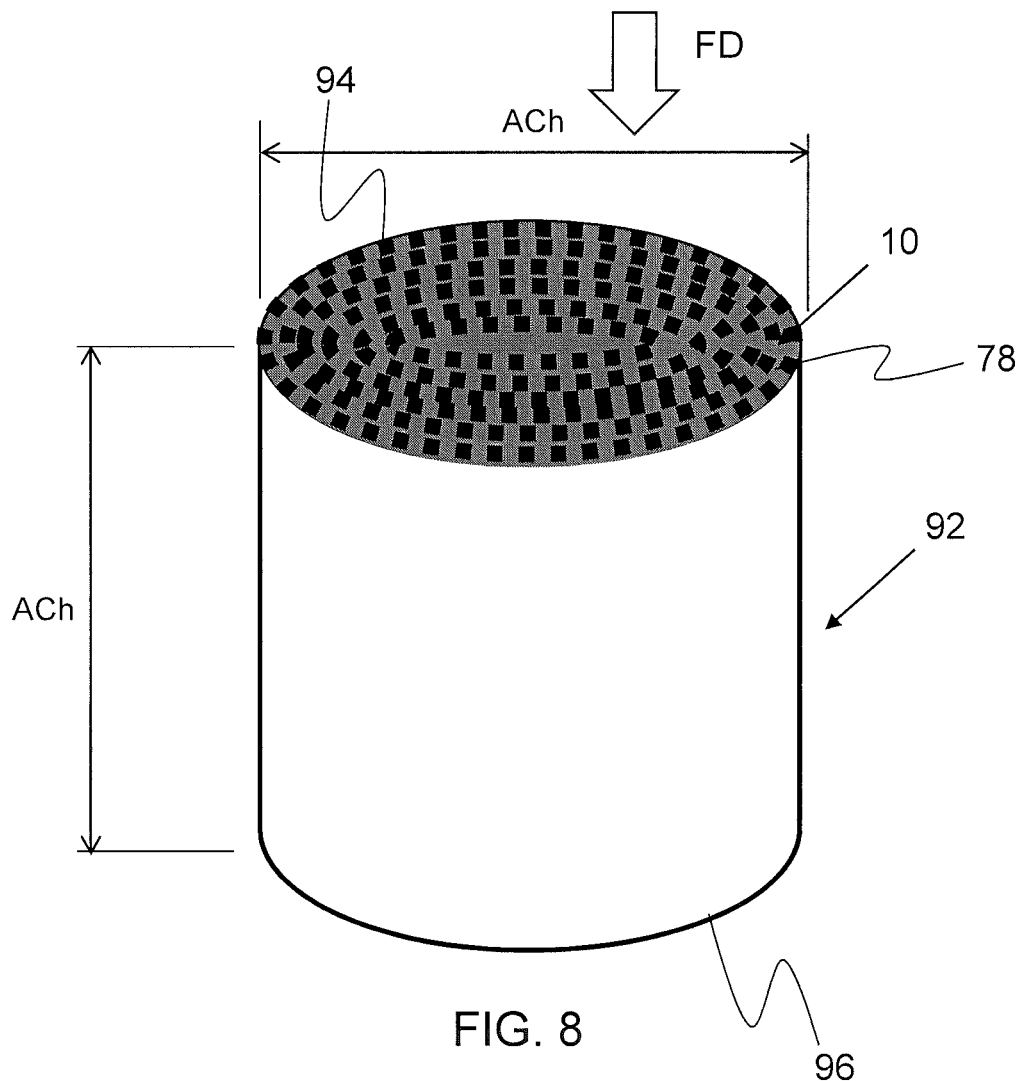
FIG. 8 shows an isometric view of an adsorbent cartridge as described herein.

The adsorbent material described herein may be made into an adsorbent pack 90, including an adsorbent cartridge 92 having a height and diameter as shown in FIG. 7 and FIG. 8 respectively. As shown in FIG. 7, adsorbent sheets 70 have been stacked to form an adsorbent pack 90 having integral channels 80 and placed into a housing 100. As shown in FIG. 8, an adsorbent cartridge 92 has been constructed from a continuous sheet 78 of adsorbent material 10 that has been wound. As depicted in FIG. 8 by the arrow, the flow direction FD indicates in the inlet 94 and outlet 96 of the cartridge. An adsorbent pack or cartridge may be used to enrich a gas by passing a fluid through the integral channels having a first gas that is adsorbed, and a second gas that is not adsorbed. The adsorbent material may be selected to either only adsorb a particular gas molecule or adsorb much more of, or at a higher rate, a specific gas molecule.

Figure 12:
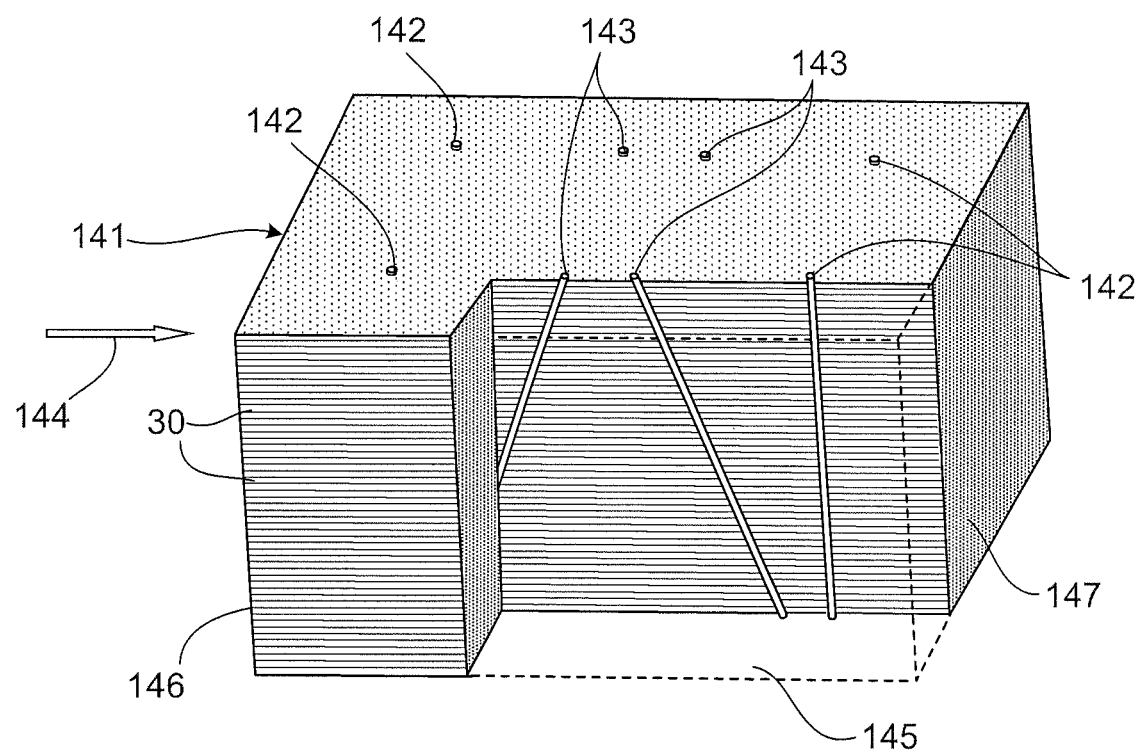
FIG. 12 is a self-supported adsorbent cartridge in which part of the adsorbent volume has been removed (for illustration purposes) to expose the stakes securely fastening the adsorbent sheets.

FIG. 12 shows an embodiment of a self-supported adsorbent cartridge 141 containing adsorbent sheets 30 in which multiple stakes 142 and 143 (8 in the embodiment depicted in FIG. 12) are driven into the adsorbent cartridge to securely hold the chemically reactive adsorbent sheets together. A volume 145 demarcated by dashed lines is removed from adsorbent cartridge 141 in FIG. 12 to expose stakes 142 and 143. These stakes enable the cartridge to maintain its correct external dimensions while simultaneously holding each sheet against the adjacent sheets. Alternatively, the adsorbent sheets can be staked with a staple or staples, a wire, rod(s), a cord, rivet(s), or elastic materials. The rigid staked cartridge may be further wrapped with a thin polymer sleeve such that the sleeve does not cover air inlet and outlet faces 146, 147 of the adsorbent cartridge. This thin sleeve prevents the end user from contacting the adsorbent chemical. The sleeve provides little or no clamping forces to hold the adsorbent cartridge together.

In some embodiments no polymer sheet is wrapped around the cartridge. The stakes rigidly hold the sheets in place such that sheet to sheet contact is maintained. As shown in FIG. 12, stakes 142 are inserted perpendicular to flow path 144 and additional cartridge stability can be achieved by inserting a stake or multiple stakes 143 at angles up to at 90 degrees with respect to flow path 144, which reduce or eliminate flexing of the cartridge. Air inlet face 146 and air outlet face 147 of cartridge 141 can be reversed should the direction of flow 144 be reversed. Cartridge 141 functions similarly for airflow from both directions.

Cartridge 141 can further include a wrap of polymer foam on four sides of the cartridge to allow for sealing when cartridge 141 is installed into a canister. The polymer foam could be installed by itself or over or under a polymer wrap.

Figure 9:
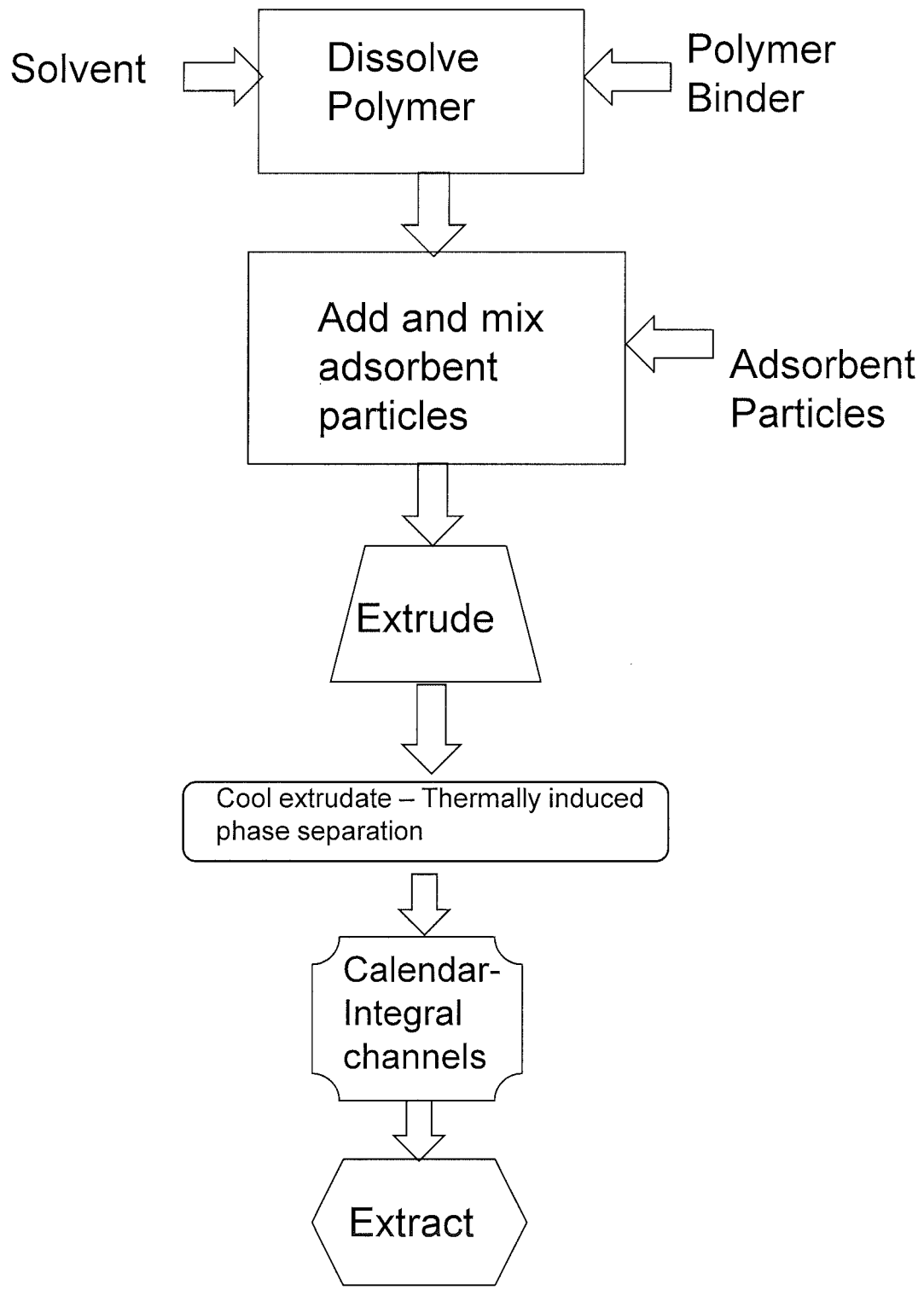
FIG. 9 shows a process schematic for making the adsorbent material described herein.
Figure 10:
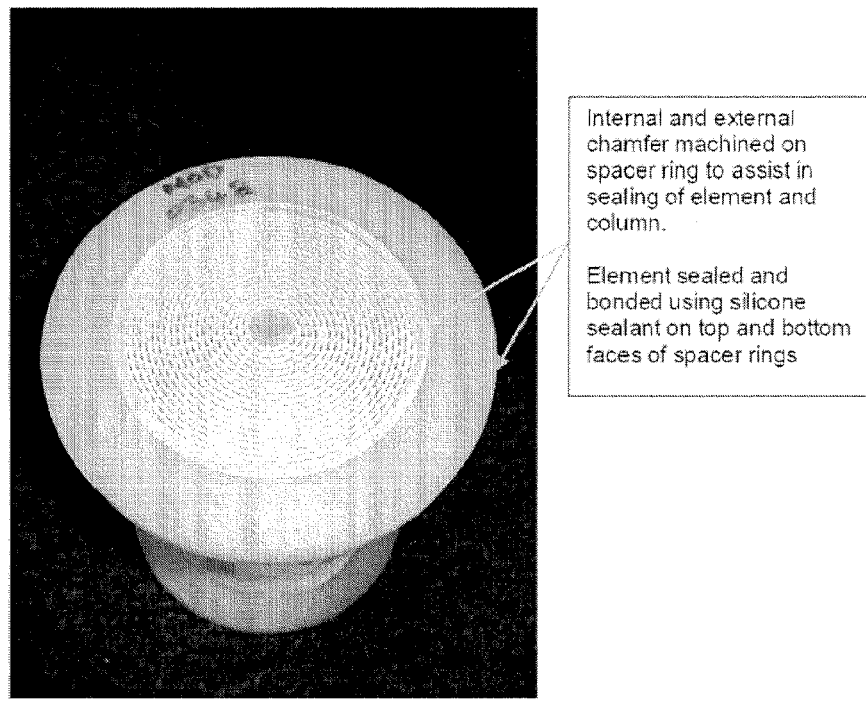
FIG. 10 shows an embodiment of a parallel passage contactor or adsorbent pack with nylon spacer rings and sealant.

The adsorbent material and pack of the present invention may be made through any suitable set of procession steps. In one embodiment, the adsorbent material is made by a thermally induced phase separation process as shown in FIG. 9, including the steps of: dissolving a polymer binder in a first solvent at elevated temperatures to form a mixture, adding and mixing adsorbent particles with the polymer mixture to form an adsorbent slurry, extruding the adsorbent slurry through a sheeting die to form an extrudate or sheet, cooling the extrudate to cause thermally induced phase separation, forming integral channels in the extrudate, and extracting the first solvent from said extrudate to form an adsorbent sheet having integral channels. The solvent may be heated to any suitable temperature to cause the selected polymer to dissolve.

The integral channels may be formed in the adsorbent sheet through any suitable process. For example, an extrudate may be passed through a calendaring roller having a profile that forms integral channels in the sheet as it passes there through. In another embodiment, discrete sheets may be pressed with a platen to form the integral channels. In yet another embodiment, integral channels may be machined into an adsorbent sheet before or after it is dried. For example, a series of grinding wheels may be used to remove adsorbent material from a sheet and therein form the adsorbent sheet with integral channels.

Figure 11:
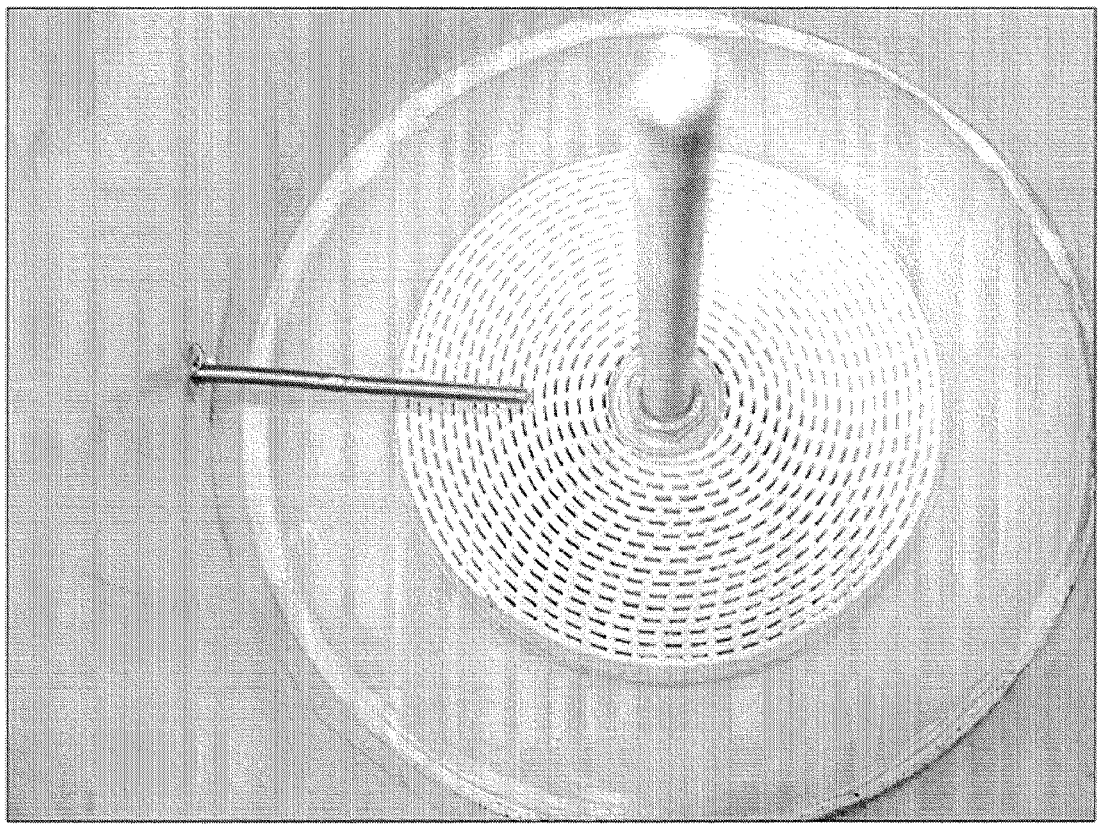
FIG. 11 shows an embodiment of a parallel passage contactor or adsorbent pack with tie rod to assist with positioning and removal of the contactor or pack during testing or use.

An embodiment of the article was tested in a pressure swing adsorption cycle test using the ISO 7183 standard, which captures the key test parameters of inlet temperature, outlet temperature, differential pressure, pressure dewpoint (chilled mirror hydrometer), inlet pressure, outlet pressure, and flow rate. The tested apparatus is analogous to that in FIG. 11, with the article being a ribbed spirally wound adsorbent sheet formed from 13× molecular sieves and an ultra high molecular weight polyethylene binder made via a thermally induced phase separation process.

In a PSA rig (endurance testing on a moisture rig), the unit completed approx 200,000 cycles and maintained a steady dewpoint (typically −37 deg. C. PDP)

In the rapid cycle rig, the unit completed 1,000,000 cycles with no real visible damage or deterioration in dew point, flow and mechanical stability which was unexpected and is an improvement over typical 13× molecular sieve 4 to 8 mesh beads with a 7 Bar pressure swing cycle. Even after being accidentally flooded, the unit was able to reobtain optimal performance after purging which was also unexpected, and would have required a system shut down and adsorbent removal if this were to occur with standard 13×, 4 to 8 mesh beads which are the current industry standard.

In a cyclic test, results indicated the consistent adsorption/desorption performance of the unit during the pressure/temperature (PTSA) test. The rapid onset of equilibrium (steady state conditions) after flooding was unexpected and a potential improvement over other 13× molecular sieve based systems.

It will be apparent to those skilled in the art that various modifications, combination and variations can be made in the present invention without departing from the spirit or scope of the invention. Specific embodiment, features and elements described herein may be modified, and/or combined in any suitable manner. Thus, it is intended that the present invention cover the modifications, combination and variations of this invention provided they come within the scope of the appended claims and their equivalents.

Continuous sheet as used herein is defined as a sheet of material that may be made in long lengths, having a machine and cross machine direction, wherein the machine direction may have a length greater than about 3 meters, greater than about 10 meters, greater than about 100 meters, greater than about 1000 meters, or between and including any of the lengths provided.

Processing direction as used herein is defined as a direction that is substantially parallel with either the machine or cross-machine direction of the material.

Substantially non-permeable as used herein in reference to the adsorbent material means that there is substantially no air flow through the material, such as having a Gurley value of greater than 100 seconds.

Oriented polymer binder as used herein is defined as a polymer binder that is elongated between, and interconnects adsorbent particles and has an aspect ratio of at least 2:1.

Aspect ratio as used herein in reference to the oriented polymer binder refers to the ratio of the length over the width, or maximum cross-length dimension within the center 30% of the length.

The maximum cross-length dimension of oriented polymer binder is the maximum dimension, width, diameter, etc, over the center 30% of the length. To measure this value, measure the length of the oriented polymer binder, find the center on an SEM image and then measure over the center 30% of the length to determine the maximum dimension.

As used herein, polymer binder consisting essentially of oriented polymer binder means that the majority of the polymer binder is elongated between, and interconnects adsorbent particles and has an aspect ratio of at least 2:1.

What is claimed is:

1. A system for pressure swing adsorption (PSA) or vacuum pressure swing adsorption (VPSA), comprising a parallel passage contactor structure comprising one or more self-supported adsorbent sheets arranged in multiple, overlapping layers mechanically spaced to allow gas flow between said layers from one end of the structure to the other, wherein said one or more adsorbent sheets are formed by a thermally induced phase separation process from a mixture comprising adsorbent particles selected from molecular sieves, activated alumina, zeolites, and activated carbon; and a polymer binder; wherein the adsorbent particles in said sheet are of one or more types and each type of adsorbent particles have a mean particle size of greater than 200 nm; wherein said binder comprises 0.5% to 5% by weight of the sheet.

2. The system of claim 1, wherein the adsorbent particles are of a single type and have a mean particle size of greater than 200 nm.

3. The system of claim 1, wherein said structure remains mechanically stable after 200,000 or 1,000,000 pressure swing cycles.

4. The system of claim 1, wherein said adsorbent sheets have substantially parallel ribs disposed on said one or more sheets, which mechanically space said layers to allow gas flow.

5. The system of claim 1, wherein said parallel contactor structure comprises a single spirally wound adsorbent sheet having substantially parallel ribs disposed on said sheet, wherein said ribs mechanically space said layers to allow gas flow.

6. The system of claim 1, wherein said binder comprises 0.5% to 4% by weight of said sheet.

7. The system of claim 1, wherein said binder comprises 0.5% to 3% by weight of said sheet.

8. The system of claim 1, wherein said binder comprises 0.5% to 2% by weight of said sheet.

9. The system of claim 1, wherein said binder comprises about 0.5% to 1% by weight of said sheet.

10. The system of claim 1, wherein said binder is a thermally induced phase separated polyethylene.

11. The system of claim 1, wherein said binder is a thermally induced phase separated high-density polyethylene.

12. The system of claim 1, wherein said binder is a thermally induced phase separated ultra high molecular weight polyethylene.

13. A parallel passage contactor structure configured for use in pressure swing adsorption (PSA) or vacuum pressure swing adsorption (VPSA), comprising one or more self-supported adsorbent sheets arranged in multiple, overlapping layers mechanically spaced to allow gas flow between said layers from one end of the structure to the other, wherein said one or more adsorbent sheets are formed by a thermally induced phase separation process from a mixture comprising adsorbent particles selected from molecular sieves, activated alumina, zeolites, and activated carbon, a polymer binder, and aramid or carbon reinforcement fibers, which have a mean length of no more than 500 um on their longest side; wherein said binder comprises 0.5% to 5% by weight of the sheet and said reinforcement fibers comprise 0.1% to 10% by weight of the sheet.

14. The parallel passage contactor structure of claim 13, wherein said reinforcement fibers no more than about 5%, no more than about 2% or no more than about 1% by weight of the adsorbent sheet.

15. The parallel passage contactor structure of claim 13, wherein said binder comprises from 0.5% to 2% by weight of said sheet.

16. The parallel passage contactor structure of claim 13, wherein the adsorbent sheet has a decreased Gurley Densometer, Model 4340 automatic Gurley Densometer time by comparison to a structure without reinforcement fibers.

17. The parallel passage contactor of claim 13, wherein said adsorbent sheets have substantially parallel ribs disposed on said one or more sheets, which mechanically space said layers to allow gas flow.

18. The parallel passage contactor of claim 13, wherein said parallel contactor structure comprises a single spirally wound adsorbent sheet having substantially parallel ribs disposed on said sheet, wherein said ribs mechanically space said layers to allow gas flow.

19. The parallel passage contactor of claim 13, wherein said contactor is up to 48 inches in height.

20. The parallel passage contactor of claim 13, wherein the reinforcement fibers have a mean length of 10 um to 250 um on their longest side.

21. A system for pressure swing adsorption (PSA), comprising the parallel passage contactor of claim 13.

22. The parallel passage contactor structure of claim 13, wherein said binder is a thermally induced phase separated polyethylene.

23. The parallel passage contactor structure of claim 13, wherein said binder is a thermally induced phase separated high-density polyethylene.

24. The parallel passage contactor structure of claim 13, wherein said binder is a thermally induced phase separated ultra high molecular weight polyethylene.

\* \* \* \* \*